No. 736,550. PATENTED AUG. 18, 1903.
J. T., W. R. & G. B. RODGERS.
BALING PRESS.
APPLICATION FILED APR. 22, 1899.
NO MODEL. 2 SHEETS—SHEET 2.
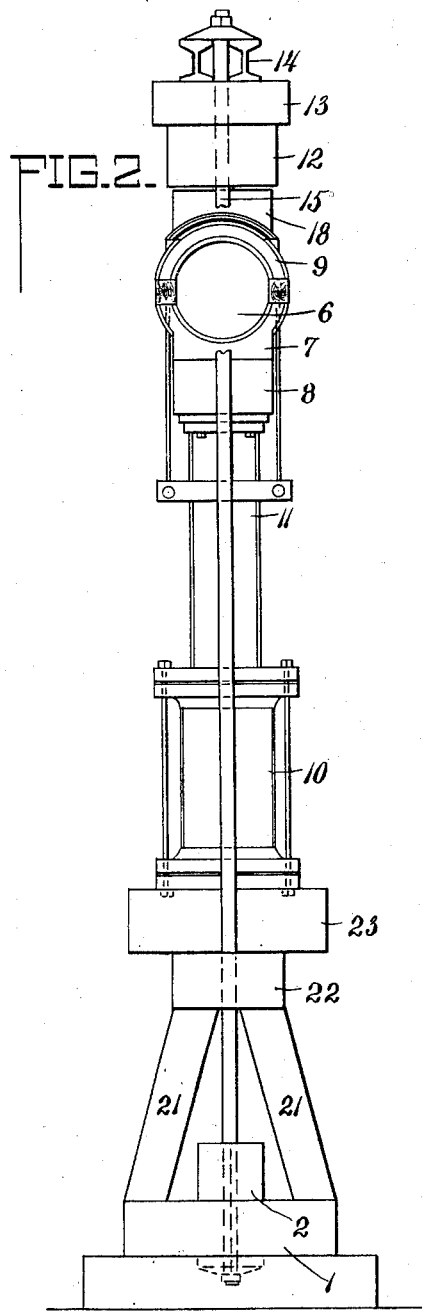
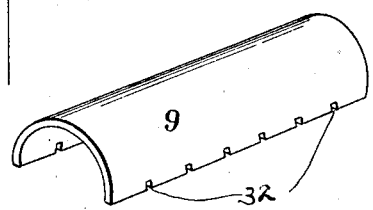
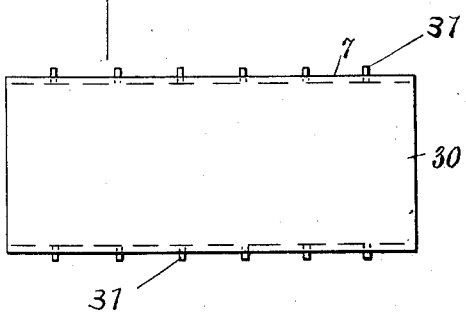
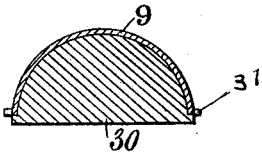

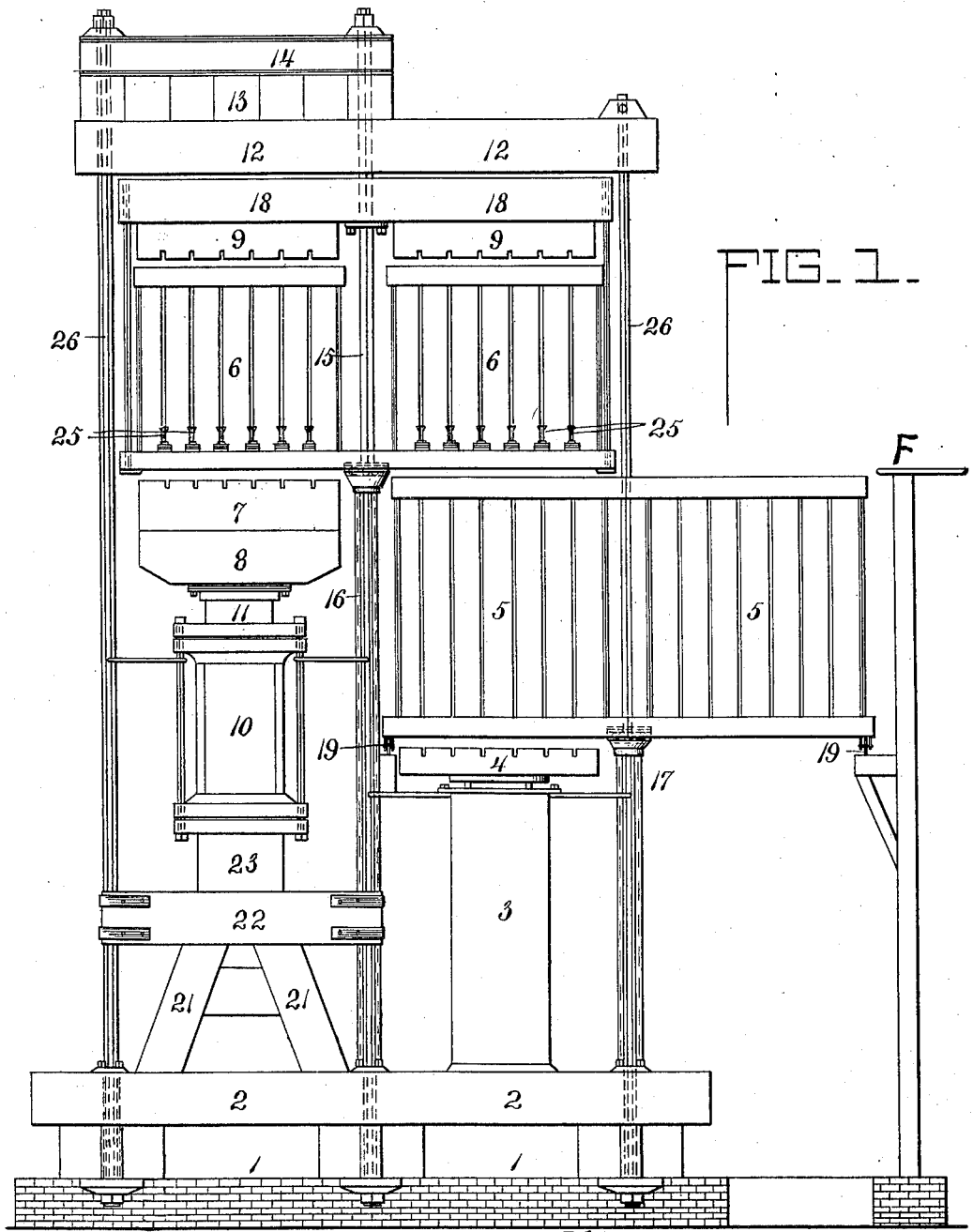

No. 736,550. Patented August 18, 1903.

UNITED STATES PATENT OFFICE.

JAMES T. RODGERS, WILLIAM R. RODGERS, AND GEORGE B. RODGERS, OF MEMPHIS, TENNESSEE.

BALING-PRESS.

SPECIFICATION forming part of Letters Patent No. 736,550, dated August 18, 1903.

Application filed April 22, 1899. Serial No. 714,095. (No model.)

*To all whom it may concern:*

Be it known that we, JAMES T. RODGERS, WILLIAM R. RODGERS, and GEORGE B. RODGERS, citizens of the United States, residing at Memphis, in the county of Shelby and State of Tennessee, have invented certain new and useful Improvements in Pressing and Compressing, of which the following is a specification.

The object of our invention is to first press or form cotton-bales and then compress them in a manner and with results not heretofore attained, the compression taking place inwardly in substantially all radial directions, whereby a greater density is obtained than has heretofore been attainable from a single compression.

In carrying out our invention we employ a cotton-press adapted for use in any and all ginning plants for the purpose of pressing or forming the ordinarily dense bale and a cooperating compress with semicylindrical platens for highly compressing the bale thus pressed or formed.

With these and minor objects in view our invention consists in features of novelty hereinafter fully set out and particularly specified in the claims.

In the drawings, Figure 1 is a side elevation of our improved bale-forming press and cooperating compress. Fig. 2 is an elevation of the compress end of the same. Fig. 3 is a perspective view of one of the semicylindrical platens detached. Fig. 4 is a top plan view of another platen; and Fig. 5 is a cross-section of the same, showing a block or filling that may be used in said platen should it be desired to obtain an ordinary square-pressed bale of low density.

1 and 2 represent the foundation of our press, which may be of any material sufficiently strong and durable.

3 is a steam baling-press cylinder constructed in the usual manner and carrying the lower moving platen 4.

While we show a steam baling-press, it is obvious that we may substitute a screw-press or hydraulic ram.

5 5 are double cotton-boxes which are pivoted on the top of the iron column 17, preferably through the medium of a ball-bearing, and adapted to swing from a charging position to the pressing or baling position above the press 3.

19 represents rollers secured at each end of the cotton-boxes 5 and adapted to rest upon the track shown to afford additional support for the boxes 5.

6 6 are upper cotton-boxes mounted to revolve (preferably on a ball-bearing) upon the column or support 16 to one side of the path of boxes 5 and adapted to swing from a position above the press 3 to a position above a compress to be described. The boxes 6 6 are provided with retainers 25, which serve to retain the bale when once forced into said boxes by the press or compress.

7 is a concave or semicylindrical platen constructed of iron or other suitable material and suitably secured to the wooden block 8 of the piston 11 of the hydraulic compress 10.

9 9 are concave or semicylindrical top blocks or platens constructed of iron or other suitable material rotating with the boxes 6 6 and conforming to the lower moving compress-platen 7, so that when the two are brought together they will conform with one another and complete a cylindrical compress-box, as shown in Fig. 2. The top blocks or platens 9 are secured to and carried by the framework of the upper cotton-boxes 6.

12 and 13 represent the top frame of the press surmounted by steel I-beams 14, thereby further strengthening the press on the compress side over the hydraulic ram 10.

18 is a beam carried by the upper cotton-boxes 6, to which are bolted the top blocks or platens 9. This beam is held in position by the center rod or column 15 and the rods 26.

21, 22, and 23 represent a foundation for the hydraulic compress 10.

We practice our invention as follows: Cotton is delivered from the floor F into the open box 5, that occupies the charging position, and when this box is full the boxes 5 5 are revolved until the box containing the charge is over the steam forming-press 3 and the other box 5 is in position for filling. The steam baling or forming press is then operated to force its platen 4 up through the box containing the charge of cotton until the cotton is forced up into one of the pair of boxes 6, where it is retained by the retainers 25. During this preliminary pressing or forming operation the other box 5 is being filled with loose cotton from the floor or from a condenser and the boxes 5 are again revolved to bring a charge over the press 3, and said charge is likewise forced up into the compress-box 6. This operation is continued until sufficient cotton is packed into one of the upper boxes 6 to form a bale, when the said box 6 is revolved to a position over the hydraulic compress, which is then put into operation and its semicylindrical moving platen 7 is forced up into the box against the cotton already pressed and formed therein by the steam-press, and said bale will be thereby compressed into great density.

By employing the semicylindrical platens described we are enabled to secure, as has been stated, a compression taking place inwardly in substantially all radial directions by compression first at the sides of the bale when the same comes into contact with the vertical portion of the curved face of the platen and then both vertically and laterally when the bale comes into contact with the entire curved face of the platen. It will therefore readily be seen that by our press we are enabled to force the bale into a lesser lateral area first and then subject the same to the vertical compression, thereby greatly increasing the density of compression.

The words "compress" and "compression" used herein are intended to convey their usual technical distinction from the mere formative action of a press in baling cotton with the ordinary density of a plantation bale.

The compression effected by the compress 10 reduces the bale to great hardness and density, even greater than is obtainable from other methods of single compression. This results from the fact that the compress-platens are semicylindrical, whereby the compression is accomplished inwardly in nearly every radial direction. The resulting bale is cylindrical. Our cylindrical bale has advantages over ordinary wound cylindrical bales, however, because we get compression in a plurality of directions where the wound bale gets compression only in the direction transverse to the web that is being wound and gets stretching or attenuation in the direction of the length of said web. Moreover, our cylindrical bale can be more successfully sampled than the round bale. Our bale has obvious advantages over the old forms of cylindrical bales pressed in the direction of their axes. These old bales receive pressure in only one direction, whereas our bale is compressed in many radial directions. Moreover, such cylindrical bales were previously made only of plantation-bale density and were not "compressed" as that term is understood in the art.

The pressing operation of the machine described as taking place before the operation of the hydraulic compress is repeated three or more times, as may be necessary, to get the desired amount of cotton into one of the boxes 6 to form a bale. The operation might stop here and the bale may be tied and thrown out in the form of an ordinary square plantation bale. Our apparatus thus serves either of two purposes. If the process is carried further and the bale compressed into a round bale of great density, it is simply tied and thrown out in the usual manner, ordinary ties or wire being used and the bale being covered with any desired material.

In order to press or form bales of square shape by the press 3, the platens 9 may be provided with the filling-blocks 30, as seen in Fig. 5, when it will be seen that since the platen 4 of said press is flat or straight on its upper face ordinary bales can be made with the bottom, top, and sides flat. To make the core or filling-block 30 easily removable for making the round compressed bales, it is provided with lugs 31, which engage loops or hooks 32 in the outer edge of the semicylindrical platen.

Having thus described our invention, the following is what we claim as new therein and desire to secure by Letters Patent:

1. The combination of a compress of the character described having a movable cylindrical platen operating under high pressure, of a pair of rotatable cotton-boxes mounted above said movable platen, of a stationary semicylindrical platen carried by each of said boxes and revoluble therewith; said boxes adapted to move from a preliminary baling position into line with said movable platen, of blocks removably secured in said stationary platens when in their preliminary baling position, and means for forming said preliminary bales.

2. In a compress of the character described, the combination of semicylindrical platens coöperating to compress fibrous material and filling-blocks removably secured within said platens, whereby said compress is capable of compressing bales of different shapes.

3. In a compress of the character described, the combination of semicylindrical platens coöperating to compress fibrous material, of loops or hooks in the outer edge of said platens, filling-blocks, lugs on said blocks, said lugs adapted to engage said loops or hooks, whereby said blocks are removably secured within said platens and said compress is capable of compressing bales of different shapes.

JAMES T. RODGERS.
WILLIAM R. RODGERS.
GEORGE B. RODGERS.

Witnesses:
R. E. CASADINE,
S. B. HOWLETT.